United States Patent Office 2,965,674
Patented Dec. 20, 1960

2,965,674

PREPARATION OF TEREPHTHALATES BY HEATING BENZOIC ACID SALTS UNDER PRESSURE OF GASES

Erhard J. Prill and James C. Wygant, Dayton, Ohio, assignors to Monsanto Chemical Company, St. Louis, Mo., a corporation of Delaware No Drawing. Filed Jan. 22, 1957, Ser. No. 635,141

2 Claims. (Cl. 260—515)

The present invention is directed to a process for preparing terephthalic acid by heating benzoic acid salts in a hydrocarbon atmosphere.

It has previously been reported that terephthalic acid can be prepared by heating potassium benzoate under carbon dioxide pressure. While the mechanism of this reaction was not clear, the carbon dioxide was believed to have some specific effect in retarding decarboxylation, or even to form carboxyl groups by addition to the benzene ring.

It is very surprising to find that alkali benzoate salts, such as rubidium and potassium benzoates, can be efficiently converted to the corresponding terephthalate salts by heating them under the pressure of gaseous hydrocarbons. The reason that this reaction takes place in this manner is not clear. Such a reaction occurs to only a small extent under nitrogen pressure, and it apparently does not occur at all under pressure of sulfur dioxide or water vapor.

As hydrocarbons for use in the present process, any stable hydrocarbons which are gaseous under the reaction conditions are suitable. For example, the paraffins, such as methane, ethane, propane, butane, 2-methylpropane, pentane, 2-methylbutane, 3-methylbutane, 1,1 dimethylpropane, hexane, heptane, octane, nonane, decane and other normal and branched aliphatic hydrocarbons which are gaseous under the reaction conditions can be used; those paraffins, with up to 8 carbon atoms will probably be most convenient for use. Similarly, various cyclic hydrocarbons such as cycloalkanes, and aromatics can be used, e.g., cyclopentane, cyclohexane, methylcyclohexane, benzene, toluene, xylenes, ethylbenzene, etc., especially those with up to 8 carbon atoms. Mixtures of hydrocarbons can be used, e.g., mixtures of any two or more of the above hydrocarbons, natural gases, coke oven gases and various types of manufactured gases, petroleum ethers and oil refinery distillates. Unsaturated as well as saturated aliphatic hydrocarbons are applicable, e.g., ethylene, propylene, butene-1, butene-2, isobutylene, pentene-1, hexene-2, etc. The hydrocarbons can contain any substituents which will not effect the stability or fundamental hydrocarbonaceous character of the hydrocarbons, so long as the substituents do not interfere in the reaction, and the term hydrocarbon is intended herein to include all such hydrocarbonaceous materials. One way of insuring that the hydrocarbon will be in the gaseous state under the reaction conditions is to use a hydrocarbon with a critical temperature below the reaction temperature, e.g., below 400° C. Of course, it will not deleteriously affect the reaction if some of the hydrocarbon is liquid under the reaction conditions, so long as gaseous hydrocarbon is present. The hydrocarbon gases can if desired be admixed with other gases which are useful in such reactions, e.g., carbon dioxide.

The reaction conditions in our process for preparing terephthalic acid by heating alkali metal benzoate salts under pressure of hydrocarbons can vary considerably. For example, the maximum hydrocarbon pressure, i.e., the hydrocarbon pressure at the reaction temperature, can vary from about 400 p.s.i. to 4000 p.s.i. or more, so long as the hydrocarbon is gaseous under the reaction conditions. If the hydrocarbon is ordinarily a liquid with low vapor pressure, it may be necessary to operate below 400 p.s.i. A maximum hydrocarbon pressure of 1000 to 3000 p.s.i. is usually very satisfactory.

The temperature of the reaction has considerable influence on the yields of terephthalic acid. The best temperatures are in the range of about 425° to about 475° C. The preferred temperatures are ordinarily in the range of about 445° C. to 455° C., particularly 450° C. While temperatures outside these above ranges, e.g., other temperatures of the order of 400 to 500° C., can be used, the yield of terephthalic acid falls off markedly in the neighborhood of 425° C. as the reaction temperature is lowered. It should be noted that the above temperature range refers to the internal temperature of the reaction chamber when such temperature is fairly uniform and substantially the same as the temperature of the chamber walls. It will be realized that under some conditions the reported temperature for a system could be outside the above ranges, although the effective reaction temperature at a "hot spot" or wall surface was within the above temperature ranges.

The reaction time can vary considerably with the temperature, pressure, type of reactor, etc. However, with the type of batch reactor used in the present examples, reaction times of, e.g., about 3 to 20 or more hours can be used. Reaction times of 6 to 15 hours are suitable. It will be realized that the best reaction times can vary from the above in continuous systems or in other batch systems, depending upon various factors such as heat transfer characteristics, agitation or lack of agitation, etc. The use of longer reaction times than the above is not ordinarily harmful, although it is undesirable from an economic viewpoint. In some cases it may be economically advantageous to use higher than optimum temperatures in order to shorten the reaction time.

The procedure of the present invention is considered applicable to any benzoic acid salts which are capable of disproportionating under the influence of heat to produce terephthalic acid salts. Such heavier alkali metal benzoates as the potassium and rubidium benzoates, i.e., benzoates of alkali metals having atomic numbers of 19 to 37, are preferred. Cesium benzoates are also applicable, but will not ordinarily be used because of the expensiveness of the cesium. The sodium benzoates when used alone and rather ineffective, but mixtures of sodium and potassium or rubidium benzoates are very effective. Lithium benzoate will not ordinarily be used unless it happens to be present in a benzoic acid salt mixture which is available. Similarly, while results with calcium and magnesium benzoates will not be comparable to those obtained with potassium and rubidium benzoates, the calcium and magnesium benzoates can be present in benzoic acid salt mixtures used in the process. One particular mixed salt which is suitable is "Trona" benzoate, a mixture of potassium and rubidium benzoates which is obtained by neutralizing benzoic acid with Tronacarb. Tronacarb is the name applied to a mixture of carbonate salts obtained as a by-product in the production of lithium from lepidolite (American Potash and Chemical Corp.). The mixture contains about 27% rubidium carbonate, about 70% potassium carbonate, and minor amounts of cesium and other metal carbonates.

The applicability of rubidium benzoate in the preparation of terephthalic acid is further set forth in our copending application, Serial No. 635,139, now abandoned, filed simultaneously with the present application; in the copending application the conversion of rubidium benzoate to terephthalic acid under carbon dioxide pressure is described and claimed.

While the unsubstituted rubidium and potassium benzoates are the preferred reactants in the present process, rubidium and potassium benzoates containing various substituents on the benzene ring, e.g., methyl- and chloro-substituents, can be used, and the use of potassium and rubidium benzoates containing non-interfering substituents at positions non-para to the carboxyl group to prepare the corresponding terephthalic acids is within the contemplation of the persent invention. Salts of condensed-ring aromatic acids, e.g., 1- and 2-naphthoic acids, are also useful.

Various promoters, such as heavy metal salts and oxides, e.g. such zinc and cadmium salts as zinc carbonate and cadmium carbonate, can be used in the present invention and their use is often advantageous.

The following examples are presented as illustrating certain embodiments of the invention, but the invention is not to be considered as limited thereto.

Example 1

At 12 equally spaced levels on a steel rack 10 inches in height, there were provided 12 small, circular glass dishes (1¼" diameter x ½" deep). A total of 24 grams (0.15 mole) of potassium benzoate was distributed in the dishes, and the rack was inserted in a 300 ml. bomb, and the bomb was charged to 690 pounds per square inch with ethane (95% purity). The bomb was then placed in a sodium, potassium, lithium nitrate bath which had been heated to 175° C. A rapid pressure increase indicated some liquid ethane was present; therefore some ethane was bled from the bomb. The temperature was then raised to 450° C. in about an hour and a half; the pressure was then 2500 p.s.i. The 450° C. temperature was maintained for 12 hours. After the bomb had cooled to 175° C., the pressure was 1450 p.s.i. The bomb was vented and opened and the material in the dishes was boiled up with 200 ml. of water and filtered to remove black solids. The filtrate was acidified with about 50 ml. of 10% hydrochloric acid; considerable carbon dioxide was evolved. The resulting precipitate was collected, boiled up with 250 ml. water, separated from the water by filtration, and washed with 125 ml. of water. The solid terephthalic acid was then dried by heating, an amount of 6.3 grams being obtained for a conversion of 50.7%. The yield was also 50.7% of theory.

Example 2

In a procedure similar to that of Example 1, except that a redistilled ethane was used, and a pinch of calcium hydride (drying agent) was placed in the even numbered dishes, a 46.6% yield of terephthalic acid was obtained. The initial pressure of ethane in this reaction was 620 p.s.i., and the maximum pressure was 2500 p.s.i.

Example 3

Potassium benzoate, 12 grams (0.075 mole), was placed in dishes in the six upper positions on the stainless steel rack, and the rack was inserted into the bomb containing 75 ml. benzene. The bomb was placed in the hot salt bath and heated to 450° C. in two hours, the pressure in the bomb then being 1500 p.s.i. The bomb was kept at 450° C. for 12 hours, and was then cooled to 175° C. and vented to allow the benzene to distill out. The bomb was opened and the material in the dishes was worked up as in Example 1 to give 3 grams of terephthalic acid for a yield of 48.2%.

Example 4

In a procedure similar to that of Example 1, 12 grams of potassium benzoate was heated under ethane pressure. However, the charge also included 1 cc. of water enclosed in double-walled gelatin capsules. The conversion to and yield of terephthalic acid was only 3.2% indicating that water has a deleterious effect upon the reaction.

Example 5

Under conditions similar to those of Example 1, potassium benzoate was heated under sulfur dioxide pressure. The potassium benzoate, 12 grams, and 60 grams of $SO_2$ were placed in the bomb, which was then placed in the salt bath. After about 2 hours, the bomb temperature was 450° C., and the pressure was 2050 p.s.i. The bomb was kept at 450° C. for 6 hours. The bomb was cooled, vented and opened, and the contents were removed. The material in the dishes was hard, dark and apparently insoluble in water. As the material was acidic, 10 ml. of 20% NaOH was added. The material and the aqueous alkali were added to 150 ml. of water and heated to boiling. Insoluble material was removed by filtration and washing with 50 ml. hot water. The filtrate was acidified with 50 ml. of 10% hydrochloric acid. The solution became slightly turbid, but no terephthalic acid separated from the solution; as there was no benzoic acid precipitate either, it appears that the entire amount of potassium benzoate was destroyed in the reaction.

For acidifying the terephthalate salts to obtain terephthalic acid, almost any acid can be used, so long as it is a stronger acid than terephthalic acid or is used under conditions which favor replacing the terephthalic acid from its salt. Among the various acids which can be used are, for example, mineral acids such as nitric acid, hydrochloric acid, phosphoric acid, sulfuric acid, etc., or organic acids, e.g., formic acid, acetic acid, and benzoic acid; or carbonic acid. When benzoic acid is used for the acidification, the alkali metal from the terephthalate salts are recovered as alkali metal benzoates which can be dried and recycled, or used in the disproportionation step. Similarly, the use of carbonic acids would result in the formation of alkali metal carbonates which can be used in preparing alkali metal benzoates for the disproportionation step.

A process of preparing terephthtalic acid by heating alkali metal benzoates, such as potassium and rubidium benzoates, under pressure of gaseous hydrocarbons has been described.

We claim:

1. A process of preparing terephthalate salts which comprises heating potassium benzoate under 400 to 4000 pounds per square inch in an atmosphere consisting essentially of ethane at temperatures of about 425° to 475° C.

2. A process of preparing terephthalic acid which comprises heating dry potassium benzoate under 2000 to 3000 pounds per square inch of gas consisting essentially of ethane at 445 to 455° C. for 3 to 20 hours, acidifying the resulting reaction product and recovering terephthalic acid therefrom.

References Cited in the file of this patent

UNITED STATES PATENTS

| 2,823,229 | Raecke | Feb. 11, 1958 |
| 2,823,230 | Raecke | Feb. 11, 1958 |

FOREIGN PATENTS

| 522,829 | Belgium | Oct. 15, 1953 |
| 1,087,229 | France | Aug. 18, 1954 |
| 1,106,832 | France | July 27, 1955 |